J. BURNS.

Velocipede.

No. 87,630.

Patented March 9, 1869.

Witnesses
Ernest F. Kastenhuber
Charles Wahlers

Inventor
Jaky Burns

United States Patent Office.

JABEZ BURNS, OF NEW YORK, N. Y.

*Letters Patent No. 87,630, dated March 9, 1869.*

IMPROVEMENT IN VELOCIPEDES.

The Schedule referred to in these Letters Patent and making part of the same.

*To all whom it may concern:*

Be it known that I, JABEZ BURNS, of the city, county, and State of New York, have invented a new and useful Improvement in Velocipedes; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

This invention relates to a velocipede in which the reach which connects the front and hind wheel, (or wheels,) and supports the saddle, straddles the front wheel, and the steering-gear acts on the hind wheel or wheels in such a manner that the propelling-force, acting alternately on one side, and then on the other, of the front wheel, has no tendency to turn said front wheel from side to side, and the operation of the velocipede is rendered much easier than that of a common velocipede, in which the steering-gear connects with the front, or driving-wheel.

This invention consists in the combination of T-shaped slotted heads, which are connected to the propelling-cranks, slides which move on the side-bars of the reach, and adjustable plates and foot-rests, which parts form simple and effectual means for the propulsion of the velocipede, as will be hereinafter more fully described.

A represents the reach of my velocipede, which supports the saddle B, and which straddles the front wheel C, being supported in front by the axle of said wheel, and in the rear by a pivot, *a*, projecting from the top of a standard, D, which rises from and is supported by the axle of the hind wheel or wheels E.

Figure 1:
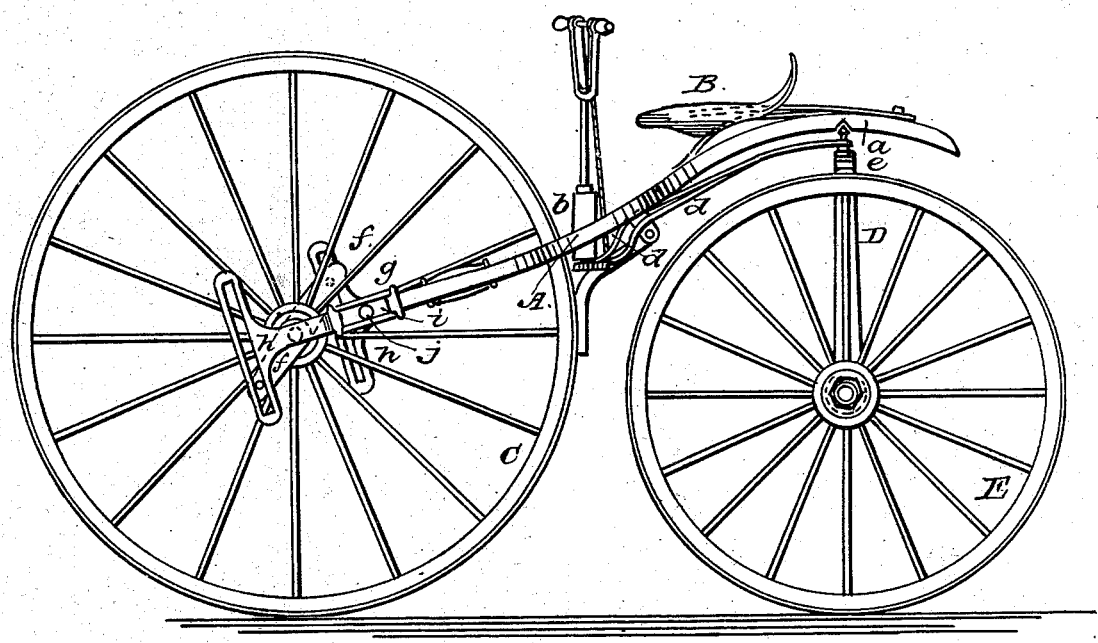
Figure 1 represents a side elevation of this invention.
Figure 2:
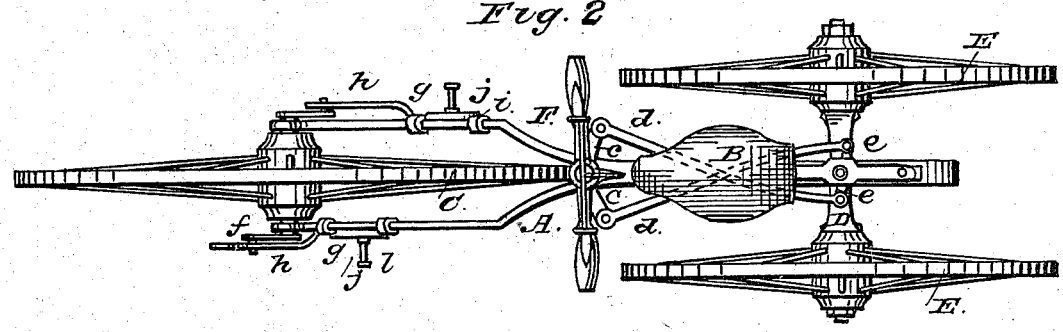
Figure 2 is a plan or top view thereof.

In front of the saddle rises the steering-lever F, which has its bearing in a tubular socket, *b*, secured to the reach A, and connects, by cranks *c* and rods *d*, with two arms, *e*, projecting in opposite directions from the standard D, as clearly shown in fig. 2 of the drawing.

The velocipede is propelled by the action of the feet on the cranks *f*, which are rigidly attached to the axle of the front wheel.

By this arrangement of the reach A, and of the steering-gear, I gain several important advantages over ordinary two-wheeled velocipedes, in which the reach A straddles the hind wheel, and the steering-gear acts on the front wheel.

In a velocipede of this kind, the power of the feet, acting on the cranks *f*, has a tendency to turn the front wheel from one side to the other; that is to say, by depressing the left foot, said wheel has a tendency to turn to the right, and by depressing the right foot, it has a tendency to turn to the left, and the rider is compelled to keep the wheel straight by means of the steering-gear, which operation, particularly in starting the velocipede, requires considerable power.

In my velocipede, the front wheel is kept straight by the reach A, and it cannot turn in either direction by the action of the propelling-force, and the steering-gear can be operated with little power, and it requires no exertion to hold the same while the velocipede is running on a straight course.

My velocipede, when made with two wheels, can be started without danger of upsetting, and it can be run with safety at a much slower speed than an ordinary velocipede.

Furthermore, if a common velocipede runs on a curve, one crank is brought close to, and the other further from the saddle, and the operation becomes awkward; but in my velocipede, the cranks always preserve the same distance from the saddle.

In the drawing, I have shown two hind wheels, instead of one, but my invention can be applied to a velocipede with one hind wheel and one front wheel, without impairing its advantages.

In many cases, however, particularly for new beginners, it is desirable to have two hind wheels, as shown in the drawing, and in a velocipede of this construction, the advantages of my invention are still more apparent, since, by connecting the steering-gear to the hind wheels, said velocipede, in turning a curve, is actually converted into a two-wheeled velocipede, because, in this case, the hind wheel, running on the inside of the curve, supports the entire weight of the rider, while the outside wheel merely skips over the ground, without sustaining any weight.

The second part of my invention relates to the arrangement of slides *g*, which have their bearings on the side-bars of the reach A, and connect with the cranks *f* by means of T-shaped slotted rods *h*.

These slides are provided with flanged guide-ways, to receive the plates *i*, from which project the foot-pieces *j*. Said plates are adjustable in the slides *g*, toward and from the saddle, and they are set in the required position by screwing up the foot-pieces *j*, or by suitable set-screws.

By means of the slides *g*, and slotted rods *h*, the foot-pieces are brought closer to the saddle than they are, if the feet are brought to bear directly upon the wrist-pins of the cranks *f*, and I am enabled to increase the diameter of the driving-wheel to any reasonable extent, and to produce a corresponding increase in the velocity of the velocipede.

And furthermore, by means of the adjustable plates *i*, the foot-pieces *j* can be adjusted for riders of different statures.

What I claim as new, and desire to secure by Letters Patent, is—

In a velocipede which is operated by power on the front wheel, has the steering-wheel at the rear, and the reach straddling said front wheel, the combination of the T-shaped slotted head, slide *g*, foot-rest *j*, and adjustable plate *i*, substantially as and for the purpose described.

JABEZ BURNS.

Witnesses:
  W. HAUFF,
  ERNEST F. KASTENHUBER.